Figure 1:
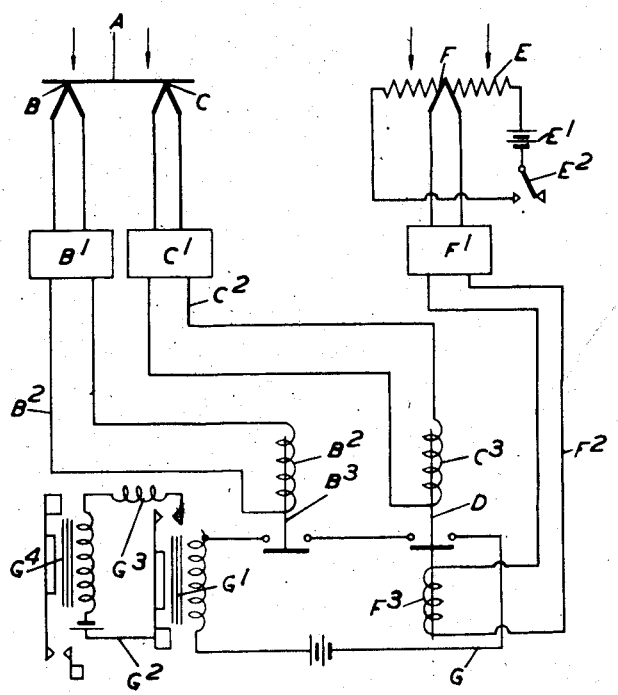

Oct. 20, 1953    J. KINSELLA    2,656,525
APPARATUS FOR DETECTING THE OCCURRENCE
OR APPROACH OF ICING CONDITIONS
Filed Jan. 20, 1950    2 Sheets-Sheet 1

Inventor
JOHN KINSELLA
By Emery Holcombe Blair
Attorneys

Patented Oct. 20, 1953

2,656,525

UNITED STATES PATENT OFFICE 2,656,525

APPARATUS FOR DETECTING THE OCCURRENCE OR APPROACH OF ICING CONDITIONS

John Kinsella, Luton, England, assignor to D. Napier & Son Limited, London, England, a British company Application January 20, 1950, Serial No. 139,770
In Great Britain January 19, 1949

9 Claims. (Cl. 340—234)

1

This invention relates to apparatus for detecting the occurrence or approach of icing conditions, that is to say of atmospheric conditions liable to cause the formation of ice on the parts of aircraft or other bodies against which the air impinges.

Such icing conditions are especially dangerous in aircraft since the formation of ice on wings or control surfaces tends to reduce their efficiency and may render them inoperative, while the formation of ice in or on the air intakes of aircraft propulsion apparatus may reduce their efficiency, render them inoperative, or cause serious damage to them.

Icing conditions are generally speaking those in which the atmospheric temperature is a little above freezing point or lower and there is present in the atmosphere free moisture and, for reasons of economy and efficiency, it is desirable that any apparatus (hereinafter called for convenience a protective system) for preventing the formation of ice or reducing the ill effects of its formation shall be in operation only for substantially as long as icing conditions persist. In practice however, it is desirable to have warning that conditions are approaching those liable to cause icing so as to enable the protective system to be brought into operation before any appreciable degree of icing actually occurs, and to ensure as far as possible against sudden serious formations of ice, as sometimes occur due to an aircraft suddenly encountering severe icing conditions.

The object of the present invention is to provide apparatus which will detect the approach or occurrence of icing conditions and operate a warning or other device to enable or cause a protective system to be brought into operation and will also preferably indicate when such icing conditions have passed and/or render inoperative such protective system as soon as such conditions have passed.

Apparatus according to the present invention for detecting the approach or occurrence of icing conditions and causing operation of a warning device or other apparatus when such conditions approach or occur comprises a temperature responsive element arranged to be subject to the atmospheric temperature, a relay device arranged to be actuated by the temperature re-

2 sponsive element so as to be inoperative at temperatures substantially above freezing point but to be brought into an operative position when the temperature approaches or reaches freezing point, an element (hereinafter called the heated element) having a surface arranged so that the atmospheric air will impinge upon it, means for supplying heat continuously to said heated element, a temperature responsive device responsive to the temperature of the heated element, discriminating relay apparatus operatively connected to the temperature responsive device associated with the heated element and adapted to move into an operative position on the occurrence of a predetermined rate of temperature drop of such heated element or when the difference between the temperature of such heated element and the temperature of the atmosphere falls below a predetermined figure, and a warning device or other apparatus (hereinafter for convenience called anti-icing apparatus) arranged to be brought into operation only when the relay device actuated by the temperature responsive element subject to atmospheric temperature and the discriminating relay apparatus actuated on the occurrence of the said predetermined rate of temperature drop or predetermined difference in temperatures both occupy their operative positions.

By a relay or relay apparatus is to be understood any apparatus or device which under the direct or indirect influence of a temperature responsive element or device or of two or more temperature responsive elements or devices controls or causes operation of some other device or apparatus whether directly or indirectly electrically mechanically or electromechanically.

It will be seen that with the present invention, whenever the atmospheric temperature is appreciably above freezing point the warning device or anti-icing apparatus will be inoperative, since an essential for bringing the warning device or anti-icing apparatus into operation is that the temperature responsive element subject to atmospheric temperature shall register a temperature which approaches or reaches the freezing point. Whatever the water content of the atmosphere at temperatures appreciably above freezing point therefore, the warning device or anti-icing apparatus will be maintained inoperative either to give a warning or, for example to bring a protective anti-icing system into operation, as is appropriate since at such temperatures, whatever the water content of the atmosphere, icing will not occur.

Similarly with atmospheric temperatures approaching or below freezing point, if the atmosphere is dry no warning will be given, since, although the temperature responsive relay associated with the temperature responsive element subject to atmospheric temperature will then be in its operative position the heated element will remain at a temperature which only varies slowly with changes in atmospheric temperature and/or is always more than the predetermined amount higher than the atmospheric temperature so that the discriminating relay apparatus will remain inoperative.

When however, the atmospheric temperature is below or only a little above freezing point and air containing any substantial amount of free moisture is encountered not only is the relay controlled by the temperature responsive device subject to atmospheric temperature in its operative position but the temperature of the heated element is rapidly and considerably reduced owing to the impingement on its heated surface of the water droplets and the consequent vaporisation of the water therefrom and the absorption of latent heat, with the result that the discriminating relay apparatus is also operated and a warning that icing conditions are threatened or are being encountered is given and/or anti-icing apparatus is brought into operation.

Figure 2:
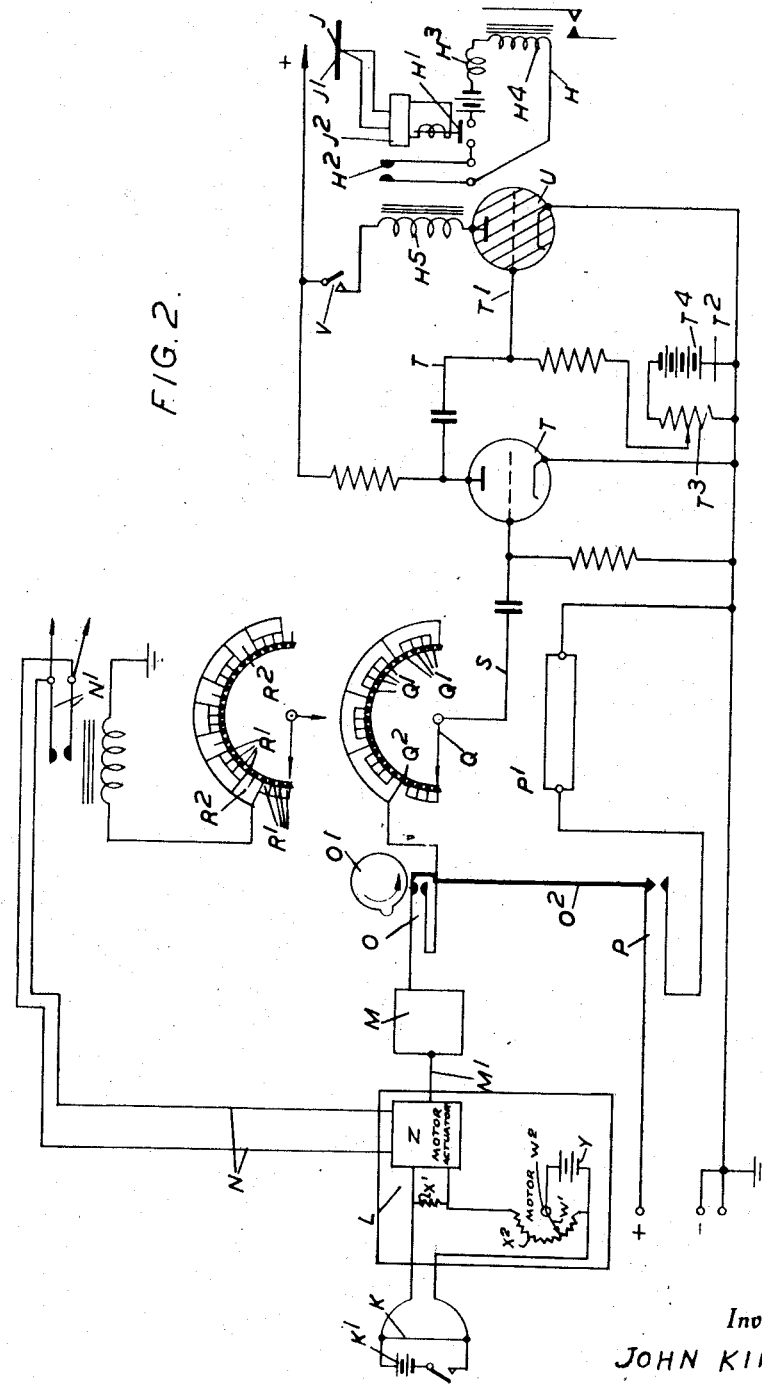

The invention may be carried into practice in various ways but two arrangements according to the invention are diagrammatically illustrated in the accompanying drawings, in which:

Figure 1 is a diagrammatic illustration of apparatus embodying discriminating relay apparatus arranged to be rendered operative on the occurrence of a predetermined temperature difference between atmospheric temperature and the temperature of a heated element, and Figure 2 is a diagrammatic illustration of the form of apparatus in which the discriminating relay apparatus is brought into operation on the occurrence of a predetermined rate of temperature drop of the heated element.

In the arrangement illustrated in Figure 1 the apparatus comprises an unheated element A subject to impingement of atmospheric air thereon and with which are associated two thermocouples B and C so as to be subject to the temperature thereof. The thermocouple B is connected to amplifying or similar relay apparatus $B^1$ of known type which in a manner known per se is arranged to close a circuit $B^2$ when the temperature of the element A approaches or reaches freezing point and thus to cause energisation of the actuating coil $B^2$ of a relay switch $B^3$ to cause this switch to close.

The thermocouple C is connected to amplifying relay apparatus $C^1$ of known type which controls in known manner the voltage in the circuit $C^2$ of that one of the energising coils, $C^3$, of a differential relay switch D which tends to close the switch D.

Also arranged so that atmospheric air impinges thereon is a resistance element E through which a heating current can be continuously delivered from a source of supply indicated at $E^1$ upon the closing of a switch $E^2$. A thermocouple F is arranged to be subject to the temperature of the heated element E, this thermocouple being connected to amplifying relay apparatus $F^1$ of known type so as to control in known manner the voltage in the circuit $F^2$ of the second energising coil, $F^3$, of the differential relay switch D which coil is arranged so as to tend to maintain the switch D open.

The switches $B^3$ and D are arranged, as shown, in series in the energising circuit G of a main relay switch $G^1$ which, when energised closes a circuit $G^2$ and thus brings into operation a warning device indicated at $G^3$ and a further relay switch indicated at $G^4$ by which de-icing apparatus can be brought into operation.

The control by the two thermocouples C and F through the amplifying apparatus $C^1$ and $F^1$ and the characteristics of the differential relay switch D are such that for differences in temperature between the element A and the element E greater than a predetermined value the force exerted by the coil $F^3$ is greater than that exerted by the coil $C^3$ and the switch D therefore remains open whereas, when the difference in temperatures between the element A and the element E falls below such predetermined value the force exerted by the coil $C^3$ overcomes that exerted by the coil $F^3$ and the switch D closes.

The control of the switch $B^3$ by the thermocouple B through the amplifying relay $B^1$ is such that this switch will normally remain open but will be closed automatically when the temperature of the element A approaches or reaches freezing point.

It will thus be seen that the circuit G will be closed only when the temperature of the element A approaches or reaches freezing point and the difference between the temperature of the element A and that of the element E is less than the predetermined value. The arrangement is such that such difference in temperature will only fall below such predetermined value when the atmosphere contains droplets of water which by impingement upon the element E materially lower its temperature below that at which it will be maintained by the impingement of dry air at the same temperature.

Thus the relay $G^1$ will only be operated when atmospheric temperature is approaching or below zero and the atmosphere contains droplets of water, that is to say when icing conditions are present or closely approached whereupon the warning device $G^3$, for example a red lamp will be energised and, if provided, the relay switch $G^4$ will be operated to bring de-icing apparatus into operation.

In a modified form of apparatus similar in other respects to that shown diagrammatically in Figure 1 instead of the amplifying devices $B^1$, $C^1$ and $F^1$ being controlled by thermocouples as indicated one or more of them may be connected to temperature responsive electrical resistance elements of the kind whose resistance varies with variations in temperature. Thus either or both of the thermocouples B and C could be replaced by such a resistance element while instead of connecting the amplifying apparatus $F^1$ to a thermocouple F, it could be connected in the circuit of the resistance element E in such a manner that it is controlled by variations in the temperature and hence the resistance of this element.

In the alternative arrangement shown in Figure 2 the apparatus comprises a main circuit H containing a relay switch $H^1$ and a relay switch $H_2$ arranged in series and also a warning device such as a red lamp indicated at $H^3$ and the energising coil of a relay switch $H^4$ adapted to bring into operation de-icing apparatus.

The energising coil of the relay switch $H^1$ is controlled by a thermocouple J subject to the temperature of an element $J^1$ on which atmospheric air impinges, the control being effected in known manner through suitable amplifying relay apparatus $J^2$ so that the energising coil of the switch $H^1$ is energised to maintain the switch open when the element $J^1$ is at a temperature appreciably above freezing point but permits the switch $H^1$ to close when the temperature of the element $J^1$ approaches or reaches the freezing point.

The relay switch $H^2$ is arranged to be closed when its energising coil $H^5$ is energised and means are provided whereby energisation of the coil $H^5$ is effected by discriminating relay apparatus only when atmospheric air containing droplets of water is encountered.

The apparatus for effecting energisation of the coil $H^5$ comprises a heated element K on which the atmospheric air impinges this element being in the form of an electrical resistance which, when the apparatus is operative is continuously heated from an electric current source $K^1$. The element might be of the kind forming the subject of my United States Patent No. 2,642,737, dated June 23, 1953. It will be appreciated that the electrical resistance of the element K will decrease as its temperature drops and vice versa. The element K is arranged in one side of the circuit of Wheatstone bridge or like circuit including a self-balancing potentiometer L of known type the potentiometer being arranged to balance the circuit automatically in known manner each time an impulse is transmitted through a circuit N which is adapted to be closed at predetermined intervals, as hereinafter described, by a relay switch $N^1$.

The potentiometer circuit is connected to an amplifier M through a conductor $M^1$ connected in the circuit so as to be subject to an E. M. F. representing the degree of out of balance, if any, of the circuit at any moment.

For illustrative purposes, the self-balancing potentiometer L as shown in Figure 2 comprises a fixed resistance $X^1$ and a balancing resistance $X^2$ connected across the input from the heated element K. The E. M. F. of a cell or battery Y is applied to any point on the variable resistance $X^2$ through a pointer $W^1$ which is driven by an actuating motor $W^2$, and the potentiometer is balanced when there is no E. M. F. developed across the fixed resistance $X^1$. Any E. M. F. which may exist across the resistance $X^1$ is fed to a thyratron-controlled actuator Z, containing two thyratrons responsive respectively to positive and negative out-of-balance potentials. The actuating motor $W^2$ comprises two units, each of which is capable of driving the pointer $W^1$ in opposite directions, and each of which is coupled to one of the actuator thyratrons.

The leads N constitute the H. T. input to the thyratrons, and as hereinafter explained they control the periods during which the actuator acts to balance the potentiometer. Any out-of-balance potential developed across the resistance $X^1$ is tapped off through the output lead $M^1$. Thus when the H. T. leads N are in circuit, one or other thyratron will be triggered by the voltage from the resistance $X^1$, and will actuate the appropriate unit of the actuating motor $W^2$ to return the potentiometer to a balanced condition.

Thus each time the switch $N^1$ is closed the potentiometer L will automatically balance the circuit so that zero E. M. F. will be applied through a conductor $M^1$ to the amplifier M, but in the time intervals between the transmission of impulses to the potentiometer the circuit will acquire a degree of out of balance and cause to be applied to the conductor $M^1$ an E. M. F. corresponding to any changes in the temperature, and hence in the resistance, of the heated element K. Thus during periods of change in the temperature of the element K the conductor $M^1$ will be subject to a gradual build up of E. M. F. during each period between successive closings of the switch $N^1$ followed by resetting of the potentiometer to bring the E. M. F. imposed upon the conductor $M^1$ to zero each time the switch $N^1$ closes. Therefore, with slow changes in the temperature of the element K the maximum E. M. F. applied through the conductor $M^1$ to the amplifier M will be correspondingly small whereas with rapid changes in the temperature of the element K the maximum E. M. F. applied through the conductor $M^1$ to the amplifier will be correspondingly great.

The amplifier M is connected to an intermittently operated switch O arranged to be closed at predetermined time intervals for example at time intervals of half a second or a second or more by means of a continuously rotating cam $O^1$ or some other automatic device. The cam $O^1$ also acts through a mechanical connection indicated at $O^2$ to close at such predetermined time intervals a second switch P controlling the circuit of the energising coil $P^1$ of an electromagnetic switch device of the rotary step-by-step type comprising two contact arms Q and R each moving over a series of contacts in the manner hereinafter described.

For convenience the two series of contacts have been shown as each extending through an arc of 180° but it is to be understood that these contacts would in fact extend through an arc of 360°.

The contact arm R moves over a series of contacts arranged in sets of five, the first four, $R^1$, of which are connected to the energising coil of the relay switch $N^1$, while the next, $R^2$, is an idle contact. Therefore, as the arm R moves round step by step the switch $N^1$ is closed momentarily as the arm passes over each of the contacts $R^1$ and then remains open for a period representing approximately two step by step movements of the arm.

The arm Q moves similarly over contacts also arranged in sets of five, the first four, $Q^1$ of which are idle contacts while the fifth, $Q^2$ is connected to the fixed contact of the switch O. Thus at the time when the arm R engages each idle contact $R^2$ the arm Q is connected through one of the contacts $Q^2$ and the switch O to the amplifier M whereby an impulse of the intensity represented by the degree of out of balance of the circuit of the potentiometer L at the moment is transmitted to the arm Q. The arm Q is connected by a conductor S to thermionic amplifying apparatus of known type indicated at T controlling the voltage applied to the grid of a thyratron valve U through a conductor $T^1$, a sensitivity control $T^2$ in the form of a potentiometer $T^3$ arranged across a battery $T^4$ being provided by which the permanent bias voltage applied to the grid of the valve U can be varied so as to enable the setting of the apparatus, that is to say the voltage which must be transmitted through the conductor S and amplifier T to cause emission in the valve U to be varied.

Arranged in the circuit of the valve U so as to be energised when emission occurs in the valve is the energising coil $H^5$ of the relay switch $H^2$ and also a resetting switch indicated at V whereby the supply of high tension current to the valve U can be cut off when desired in order to stop emission in the valve and hence operation of the apparatus.

It will be seen that with the arrangement shown when the temperature of the atmospheric air is appreciably above freezing point the switch $H^1$ will be permanently open and hence the warning device $H^3$ and the relay $H^4$ cannot in any circumstances be caused to operate, whether the switch $H^2$ is closed or not. Under these conditions therefore, although, if atmospheric air with droplets of moisture is encountered so as to cool the element K rapidly, the resultant substantial degree of out of balance of the potentiometer circuit when the arm R next engages a contact $R^2$ and the arm Q engages a contact $Q^2$ will impose a voltage through the amplifier T on the grid of the valve U sufficient to cause emission in the valve U and hence to cause the switch $H^2$ to close, this will have no effect upon the warning device $H^3$ or the relay $H^4$.

If similar conditions arise, however, when the atmospheric temperature is at freezing point or below so that the switch $H^1$ is closed, the closing of the switch $H^2$ will automatically energise the warning device $H^3$ and the relay device $H^4$.

It will be understood that the rate of rotation of the cam $O^1$ would be chosen in relation to the characteristics of the other parts of the apparatus so as to give approximately short re-setting intervals for the potentiometer to prevent operation of the relay switch $H^5$ by more changes in atmospheric temperature while yet ensuring operation on the occurrence of a more rapid change in temperature of the element K due to impingement of water droplets thereon.

It will also be understood that the arrangements have been shown purely diagrammatically, since the various parts thereof are of well known form and structure and in themselves form no part of the present invention and it will be understood that any convenient known form of relays, amplifiers, self balancing potentiometer and similar devices may be employed.

It will further be understood that the apparatus will tend to operate if snow is encountered since the heated element, E or K, would then be substantially cooled by the impingement of the snow thereon and the absorption of latent heat by the melting and/or vaporisation.

The form of the unheated temperature responsive element $J^1$ and of the heated element K may vary. For example in one arrangement these two elements would be of the same general form with forwardly facing surfaces projecting for example in front of the leading edge of an aircraft wing and each of the kind forming the subject of my United States Patent No. 2,642,737.

What I claim as my invention and desire to secure by Letters Patent is:

1. Apparatus for detecting and bringing apparatus into operation upon the approach or occurrence of icing conditions constituted by free liquid water droplets in the atmosphere at or near freezing point, including in combination an unheated temperature-responsive element arranged to be subject to atmospheric temperature, a relay device arranged to be controlled by the unheated temperature-responsive element so as to remain in an inoperative condition at atmospheric temperatures substantially above freezing point but to be rendered operative at atmospheric temperatures approaching or reaching freezing point, a heated temperature responsive element having a surface arranged so that the atmospheric air will impinge upon it, means for supplying heat continuously to the heated element, a device responsive to the temperature of the heated element, discriminating relay apparatus operatively connected to the device responsive to the temperature of the heated element and adapted to become operative on the occurrence of a predetermined temperature drop of the heated element below any temperature drop due solely to the temperature of the atmospheric air, and a warning or other device or apparatus arranged to be brought into operation only when the relay device controlled by the unheated temperature responsive element and the discriminating relay apparatus are both rendered operative.

2. Apparatus for detecting and bringing apparatus into operation upon the approach or occurrence of icing conditions constituted by free liquid water droplets in the atmosphere at or near freezing point including in combination at least one unheated temperature-responsive element arranged to be subject to atmospheric temperature, a relay arranged to be controlled by an unheated temperature-responsive element so as to remain in an inoperative condition for atmospheric temperatures substantially above freezing point but to be rendered operative at atmospheric temperatures approaching or reaching freezing point, a heated temperature-responsive element having a surface on which the atmospheric air will impinge, means for supplying heat continuously to the heated element, a device responsive to the temperature of the heated element, discriminating relay apparatus operatively connected to the device responsive to the temperature of the heated element and to an unheated temperature-responsive element arranged to be rendered operative only when the difference in temperature between the heated element and the unheated element falls below a predetermined value, and warning or other apparatus arranged to be brought into operation only when the relay controlled by the unheated temperature-responsive element and the discriminating relay apparatus are both in their operative conditions.

3. Apparatus for detecting and bringing apparatus into operation upon the occurrence or approach of icing conditions constituted by free liquid water droplets in the atmosphere at or near freezing point including in combination at least one unheated temperature-responsive element subject to the atmospheric temperature, a relay arranged to be controlled by the unheated temperature-responsive element so as to remain inoperative for atmospheric temperature substantially above freezing point but to be rendered operative at atmospheric temperatures approaching or reaching freezing point, a heated temperature-responsive element having a surface on which the atmospheric air will impinge, means for supplying heat continuously to the heated element, apparatus responsive to the rate of change of the temperature of the heated element including discriminating relay apparatus which is rendered operative only when a predetermined rate of change of temperature occurs, and warning or other apparatus arranged to be rendered operative only when the relay controlled by the unheated temperature-responsive element and the apparatus responsive to the rate of change of temperature of the heated element are operative.

4. Apparatus as claimed in claim 1, in which at least one of the temperature-responsive elements includes a thermocouple controlling suitable amplifying or other relay apparatus.

5. Apparatus as claimed in claim 1, in which at least one of the temperature-responsive elements is in the form of an electrical resistance, the resistance of which varies with variations in its temperature, connected to electrical apparatus responsive to such variations in resistance.

6. Apparatus as claimed in claim 2, in which each of the temperature-responsive elements is in the form of a thermocouple and the discriminating relay apparatus includes a differential relay device subject to opposing forces controlled respectively by the temperature responsive device associated with the heated element and a temperature-responsive device subject to atmospheric temperature.

7. Apparatus as claimed in claim 3, in which the relay apparatus controlled by the heated temperature-responsive element includes a bridge circuit including a self-balancing potentiometer, means for automatically transmitting balancing impulses at predetermined time intervals to the said potentiometer to cause it to balance the said bridge circuit, discriminating relay apparatus arranged to become operative to close a relay switch on the application to the apparatus of a predetermined electromotive force, and means for automatically connecting the discriminating relay apparatus to the bridge circuit at predetermined time intervals, each including a predetermined period between the transmission of two successive balancing impulses to the potentiometer.

8. Apparatus as claimed in claim 7, in which the discriminating relay apparatus includes a thermionic valve requiring the application thereto of a predetermined voltage to cause emission, means for applying to the valve a voltage dependent upon the out of balance of the bridge circuit during each period when the discriminating relay apparatus is connected to the bridge circuit and a relay arranged to be operative only when emission of the valve takes place.

9. Apparatus for detecting and bringing apparatus into operation upon the approach or occurrence of icing conditions constituted by free liquid water droplets in the atmosphere at or near freezing point including in combination an unheated temperature-responsive device subject to atmospheric temperature, a second temperature-responsive device arranged for impingement thereon of atmospheric air and provided with means for supplying heat continuously thereto, and discriminating relay apparatus controlled by the temperature-responsive devices so as to be rendered operative only when atmospheric temperature approaches or reaches freezing point and the heated temperature-responsive device acquires a temperature relatively to the unheated temperature-responsive device such as indicates that a substantial degree of cooling of the heated temperature-responsive device is being effected by impingement of water particles thereon in addition to the cooling due to impingement of atmospheric air thereon.

JOHN KINSELLA.

References Cited in the file of this patent

UNITED STATES PATENTS

| Number | Name | Date |
|---|---|---|
| 2,269,019 | Hall | Jan. 6, 1942 |
| 2,421,166 | Sherlock | May 27, 1947 |
| 2,444,030 | Burch | June 29, 1948 |